Feb. 15, 1966     C. W. KRUCKEBERG     3,235,129
FLUID PROPORTIONER

Filed Feb. 27, 1963     2 Sheets-Sheet 1

INVENTOR.
CHRISTIAN W. KRUCKEBERG
BY *Albert L. Jeffers*
ATTORNEY

United States Patent Office

3,235,129
Patented Feb. 15, 1966

3,235,129
FLUID PROPORTIONER
Christian W. Kruckeberg, Fort Wayne, Ind., assignor to Lincoln Manufacturing Co., Fort Wayne, Ind., a corporation of Indiana
Filed Feb. 27, 1963, Ser. No. 261,305
13 Claims. (Cl. 222—135)

The present invention relates to a proportioner for fluids, and more particularly the invention relates to a mechanism which will inject a liquid or concentrate into a line connected to the outlet of a positive displacement reciprocating pump.

It is an object of the invention to provide a proportioner that can be operated as a slave meter pump.

A further object of the invention is to provide a proportioner which is extremely accurate and will operate efficiently in a range of 8 to 1, to 80 to 1.

Yet another object of the invention is to provide a meter pump adapted to be operated by a liquid pulsating pressure created by a positive displacement pump.

A salient object of the invention is to provide a meter pump adapted to be operated by a positive displacement pump provided with a bypass wherein when the displacement pumps bypass is operating no bypass means is required for the meter pump.

It is still another object of the invention to provide a meter pump having an adjustable cylinder which will control the displacement of the piston so that the liquid being transferred by the meter pump is accurately controlled.

A further object of the invention is to provide a meter pump adapted to be operated by a positive displacement pump which will always pump against the pressure created by the positive displacement pump.

Yet another object of the invention is to provide a pressure washer wherein a concentrate detergent, such as soap or gunk, can be injected on the downstream side of the positive displacement pump, thus preventing or avoiding any harmful action the detergent might have on the parts of the positive displacement pump that would occur if the detergent was inserted on the inlet side of the positive displacement pump.

Another object of the invention is to provide a pressure washer that may be used for pressure cleaning of vats, garbage cans, engines, restaurant equipment, etc., wherein the detergent or gunk is injected on the downstream side of a positive displacement pump.

Other objects and features of the present invention will become apparent from a consideration of the following description, which proceeds with reference to the accompanying drawings wherein.

Figure 1:
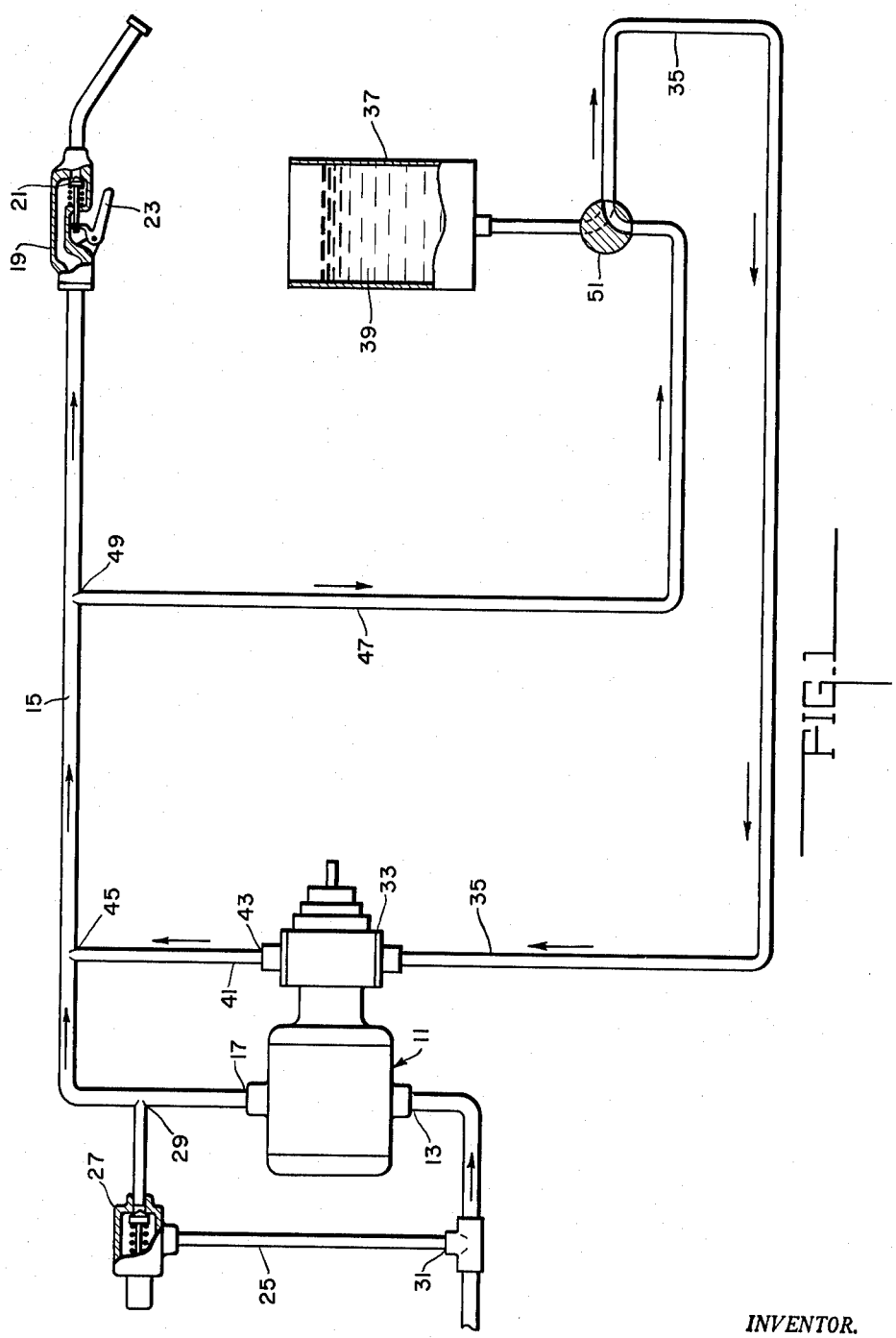
FIGURE 1 is a schematic diagram of the proportioning system.

Referring now to FIGURE 1 of the drawings, the reference numeral 11 designates a positive displacement reciprocating pump having an inlet line 13 connected to a first source of liquid supply. The outlet line 15 is connected to the discharge side of the pump 11 at 17. The other end of the outlet line 15 is provided with a control nozzle 19 having a valve 21 adapted to be actuated by a lever 23. A bypass line 25 having a one-way valve 27 is connected to the outlet line 15 at 29 and to the inlet line 13 at 31.

The meter pump 33 is mounted on the pump 11 and has an inlet line 35 connected to a container 37 which contains a second source of liquid supply such as liquid soap, gunk, or a concentrate 39. The discharge line 41 is connected to the meter pump at 43 and to the outlet line 15 at 45.

A priming line 47 is connected to the outlet line 15 at 49 and to the inlet line 35 through a two-way valve 51.

Figure 2:
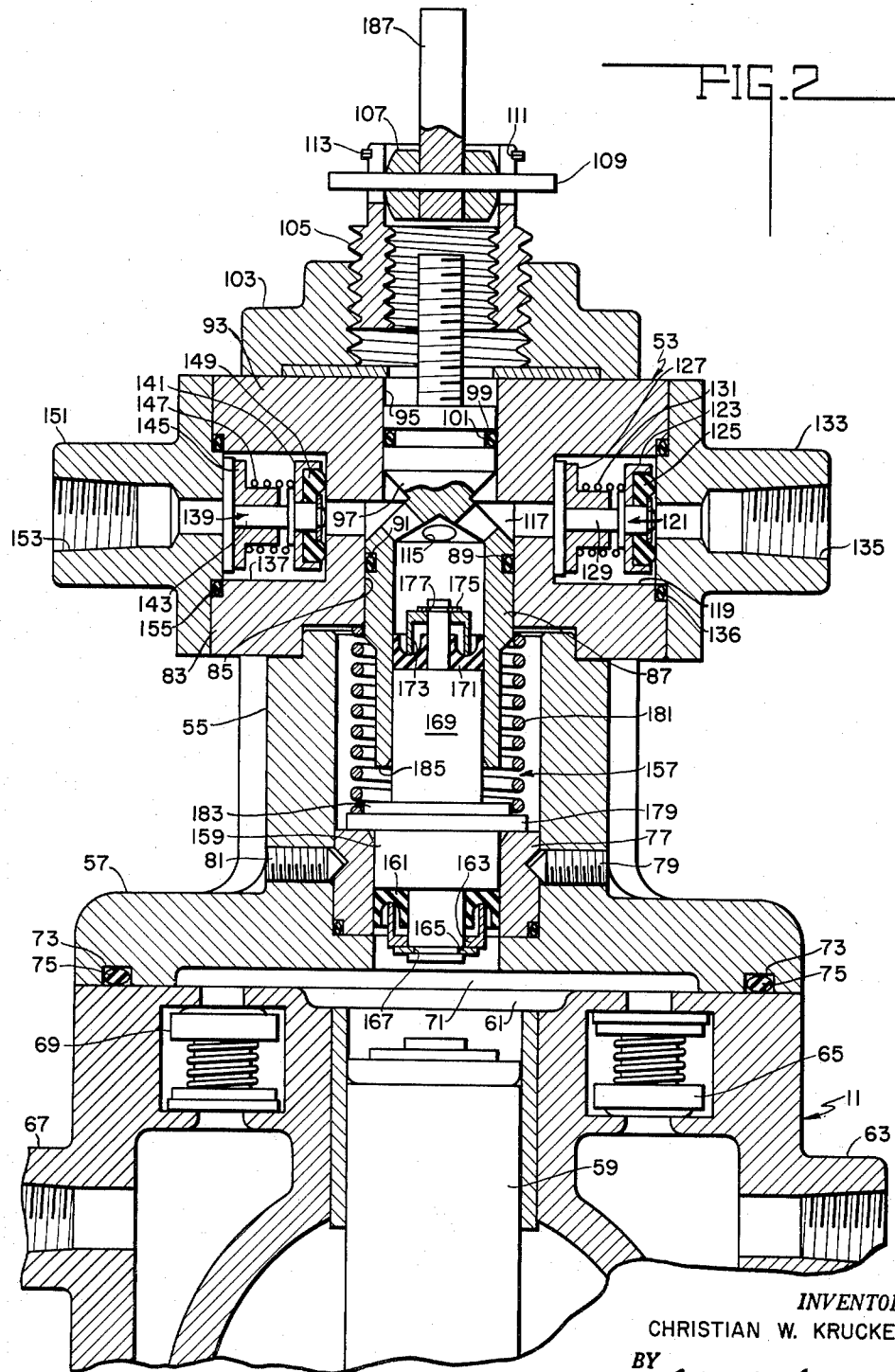
FIGURE 2 is a vertical sectional view of the meter pump mounted on a positive displacement pump.

Referring now to FIGURE 2, the reference numeral 53 designates a meter pump having a housing 55 provided with a base member 57 adapted to be mounted on the pump 11.

The pump 11 is provided with a piston 59 and a head chamber 61. The head chamber 61 is connected to the inlet 63 through a one-way valve 65. The pump outlet 67 is connected to the head chamber 61 through a one-way valve 69. The pump 11 is a conventional high pressure piston type pump with the head removed so that the base member 57 may be mounted in place of the conventional head. The base member 57 is provided with a recess 71 and is spaced to form a part of the head chamber 61. The base member 57 is provided with a recess 73 to receive an O-ring 75 to provide a seal between the base member 57 and the pump 11.

A piston sleeve 77 is permanently or rigidly mounted within the housing 55 by a pair of set screws 79 and 81. The pumping head 83 is provided with a bore 85 to receive the adjustable cylinder 87. The cylinder 87 is provided with a recess 89 to receive an O-ring 91 which serves to provide a seal between the cylinder 87 and the bore 85. The upper portion 93 of the pumping head or body 83 is provided with a bore 95 for receiving the upper portion 97 of the adjustable cylinder 87. The upper portion 97 is provided with a recess 99 to receive an O-ring 101 which serves to seal the cylinder portion 97 with respect to the bore 95.

The pump cap 103 is provided with a conventional differential nut 105 adapted to be actuated by a ball and socket 107 through the pin 109. The differential nut 105 is provided with a recess 111 for receiving a retaining ring 113. The cylinder 87 is provided with a port 115 for communication with the head chamber 117.

The pumping head 83 is provided with a bore 119 adapted to receive a one-way valve 121. The valve 121 is of conventional construction comprising a valve poppet 123, flexible member 125, poppet guide 127, a pin 129 and a spring 131.

The inlet pump fitting 133 is provided with a threaded portion 135 for receiving the inlet line 35. The O-ring 136 provides a seal between the fitting 133 and the head portion 83. The head portion 83 is provided with a bore 137 adapted to receive a one-way valve 139. The valve 139 is of conventional construction comprising a valve poppet 141, stem 143, guide 145, spring 147 and a flexible member 149. The outlet fitting 151 is provided with a threaded portion 153 to receive the outlet line 41. The O-ring 155 provides a seal between the fitting 151 and the head portion 83.

A single acting, floating piston 157 is adapted to reciprocate in the adjustable cylinder 87 and the sleeve 77. The larger head portion 159 of the piston is provided with a U-shaped flexible member 161 which may be constructed of Viton, Teflon, rubber, or other suitable material, depending upon the type of liquid being transferred by the pump 11. A U-shaped cup retainer 163 is secured to the piston head 159 by a ring 165 disposed in a recess 167. The smaller head portion 169 which is adapted to reciprocate in the adjustable cylinder 87, is provided with a flexible U-shaped cup member 171 which may be constructed of Viton, Teflon, rubber, or other suitable material, depending upon the type of concentrate or other liquid being transferred by the meter pump. The U-shaped flexible member 171 is retained on the piston by a U-shaped retainer 173 and ring 175 disposed in the recess 177.

The piston is provided with a radial projection 179 which serves as a seat for the spring 181 and is a stop against the sleeve 77 when the piston is in its down stroke. The radial projection 183 serves as a stop for the piston against the lower portion 185 of the adjustable cylinder 87 on its up stroke.

*Operation*

When it is desired to place the proportioning system in operation the stem 187 is rotated to operate the differential nut 105 which is provided with left and right hand threads to adjust the cylinder 87 axially with respect to the sleeve 77. In this respect it will be noted that the cylinder 87 is in axial alignment with the sleeve 77. The axial adjustment of the cylinder 87 varies the length of the stroke of the floating piston 157 by spacing the end 185 of the cylinder 87 with respect to the sleeve 77, which in turn controls the displacement of the smaller cylinder 169.

The two-way valve 51 is then positioned so that the priming line 47 communicates with the inlet line 35. The pump 11 is then placed in operation so that liquid from the first source of supply 13 is transferred to the outlet line 15, priming line 47, valve 51, line 35 to the meter pump 33 which in turn discharges it into the outlet line 15 through the discharge line 41. The two-way valve 51 is then rotated so that the container 37 is placed in communication with line 35.

The proportioning system is now conditioned for operation and the liquid 39 from the second source of supply will be injected into the outlet line 15 when the control nozzle 19 is operated.

One of the salient features of this invention is that no bypass line is required for the meter pump 33 due to the fact the piston 157 is of the floating type. When the control nozzle 19 is closed the pump 11 will create a maximum pressure through its bypass line which is prevalent in the outlet line 15 and in the inlet line 13. Under this condition the pulsating pressure in the chamber 61 is transmitted to chamber 117 through the piston 157. Since these two pressures are substantially equal, the piston 157 will not be reciprocated.

In this respect it should be noted that the pump 11 is a positive displacement pump which creates a pulsating pressure in the head chamber 61 when the control nozzle 19 is opened. Thus when the valve 65 is open the piston 157 will be in the position shown in FIGURE 2. When the valve 65 is closed and the valve 59 is open the piston will move upwardly until the projection 183 contacts the position 185 on the cylinder 87. The spring 181 will then return the piston 185 to its normal position on the down stroke of piston 59.

It should also be noted that the piston head 169 is smaller than the piston head 159 and thus the meter pump will always be capable of producing a pressure greater than the pressure created by the pump 11, which will insure that the meter pump will always inject liquid into the outlet line 15.

While a particular embodiment of this invention is shown above, it will be understood, of course, that the invention is not to be limited thereto, since any modifications may be made, and it is contemplated therefore, by the appended claims, to cover any such modifications as fall within the true spirit and scope of this invention.

I claim:
1. A fluid proportioner comprising, in combination,
    (a) a flow line for liquid having a control nozzle disposed at one end,
    (b) means connected to a first source of liquid supply for providing a continuously pulsating pressure to said flow line,
    (c) a bypass line connected to said flow line to bypass the liquid when the control nozzle is closed but not bypass the liquid when the control nozzle is open,
    (d) a meter pump means connected to a second source of liquid supply,
    (e) said meter pump means connected for operation by the pulsating pressure means, and
    (f) means connecting the meter pump means to the flow line between the control nozzle and the pulsating pressure means.
2. A fluid proportioner comprising, in combination:
    (a) a liquid inlet line connected to a first source of liquid supply and a liquid outlet line,
    (b) means connected to the inlet line and outlet line for providing a continuously pulsating liquid pressure to said outlet line,
    (c) a meter pump means connected to a second source of liquid supply,
    (d) said meter pump means adapted to be operated by the pulsating liquid pressure means to produce a pressure greater than the pressure created by the pulsating liquid pressure means, and
    (e) means connecting the meter pump means to the liquid outlet line to add liquid from the second source of liquid supply to the liquid being transferred from the first source of supply.
3. A fluid proportioner comprising, in combination:
    (a) a continuously pulsating pump having an inlet line connected to a first source of liquid supply,
    (b) an outlet line connected to the discharge side of said pulsating pump,
    (c) an auxiliary meter pump adapted to be operated by said pulsating pump to produce a pressure greater than the pressure created by the pulsating pump,
    (d) said meter pump connected to a second source of liquid supply, and
    (e) means for connecting said meter pump to the outlet line on the discharge side of the pulsating pump to add liquid from the second source of supply to the liquid being transferred by the pulsating pump from the first source of liquid supply.
4. A fluid proportioner comprising, in combination:
    (a) a continuously pulsating pump having an inlet line connected to a first source of liquid supply,
    (b) an outlet line connected to the discharge side of said pulsating pump,
    (c) a pressure responsive bypass line provided with a one-way valve connected to the inlet and the outlet line,
    (d) said pulsating pump having a head chamber,
    (e) a meter pump having a cylinder with a floating piston disposed therein,
    (f) said cylinder connected to the head chamber of said pulsating pump so that the floating piston will be actuated when the pulsating pump is in operation,
    (g) said meter pump having an inlet connected to a second source of liquid supply, and
    (h) means for connecting the meter pump discharge to the outlet line on the discharge side of the pulsating pump so that liquid from the second source of supply will be added to the liquid being transferred from the first source of supply.
5. A fluid proportioner comprising, in combination:
    (a) a positive displacement continuously pulsating pump having an inlet line connected to a first source of supply,
    (b) an outlet line connected to the discharge side of said positive displacement pump,
    (c) a pressure responsive bypass means including a one-way valve connected to the inlet line and to the outlet line,
    (d) said positive displacement pump having a head chamber,
    (e) a meter pump having a floating piston disposed therein,
    (f) said floating piston adapted to be operated by the pulsating pressure created in the head chamber,
    (g) said floating piston adapted to remain in a sta- tionary position when the positive displacement pump is discharging through the bypass means, (h) said meter pump having an inlet connected to a second source of liquid supply, and (i) means for connecting the meter pump discharge to the outlet line so that the liquid from the second source of supply will always be injected on the down stream side of the liquid being transferred by the positive displacement pump.

6. A fluid proportioner comprising, in combination:
(a) a continuous pulsating pump having a head chamber,
(b) said pulsating pump having an inlet line connected to a source of liquid supply,
(c) an outlet line connected to the discharge side of said pulsating pump,
(d) a pressure responsive bypass line provided with a one-way valve connected to the inlet line and to the outlet line,
(e) a meter pump having a cylinder with a floating piston disposed therein,
(f) said meter pump mounted on the pulsating pump with the cylinder communicating with the head chamber so that the floating piston will be actuated when the pulsating pump is in operation,
(g) said meter pump having an inlet line connected to a concentrate supply means,
(h) a primer line provided with a three-way valve means connected to the outlet line and to the inlet line of the meter pump, and
(i) means for connecting the meter pump discharge to the outlet line on the discharge side of the pulsating pump so that the concentrate will be injected into the outlet line from the pulsating pump.

7. A fluid proportioner comprising, in combination:
(a) a pulsating pump connected to a source of liquid supply,
(b) an outlet line having a control nozzle disposed at one end, said outlet line having its other end connected to said pulsating pump,
(c) a concentrate supply means, and
(d) means for injecting a predetermined amount of concentrate at a pressure greater than the pressure created by the pulsating pump into the liquid being transferred by the pulsating pump.

8. A fluid proportioner comprising, in combination:
(a) a continuously pulsating pump having an inlet line connected to a first source of liquid supply,
(b) an outlet line connected to the discharge side of said pulsating pump,
(c) said pulsating pump provided with a head chamber,
(d) a meter pump having a ridged, mounted piston sleeve and an adjustable cylinder,
(e) a floating piston disposed within the ridged, mounted sleeve and the adjustable cylinder,
(f) said meter pump mounted on the pulsating pump with the head chamber in communication with the ridged, mounted sleeve so that the floating piston will be actuated when the pulsating pump is in operation,
(g) a second source of liquid connected to the meter pump,
(h) adjustment means for positioning the adjustable cylinder axially with respect to the floating piston to control the length of stroke of said piston so that a predetermined amount of liquid from the second source will be moved in proportion to the liquid moved by the pulsating pump, and
(i) means for connecting the meter pump discharge to the outlet line on the discharge side of the pulsating pump so that the liquid from the second source will be injected into the said outlet line.

9. A meter pump adapted to be operated by a pulsating pump comprising, in combination:
(a) a housing having an inlet and an outlet,
(b) a piston sleeve disposed within the housing,
(c) an adjustable cylinder mounted within the housing and in axial alignment with the piston sleeve,
(d) said adjustable cylinder having a smaller inside diameter than the piston sleeve,
(e) a floating piston disposed in the piston sleeve and cylinder,
(f) a first one-way valve disposed in the housing inlet,
(g) a second one-way valve disposed in the housing outlet,
(h) said piston provided with a radial projection means intermediate its ends, and
(i) means for adjusting the cylinder axially with respect to the piston sleeve to control the length of the stroke of the floating piston.

10. A meter pump adapted to be operated by a liquid pulsating pressure created in the head chamber,
(a) a housing having an inlet and an outlet,
(b) a cylindrical sleeve disposed within the housing,
(c) an adjustable cylinder mounted within the housing in axial alignment with the cylindrical sleeve,
(d) one end of the cylinder being in communication with the housing inlet and outlet,
(e) said cylinder having a smaller inside diameter than the sleeve,
(f) a floating piston disposed in the sleeve and cylinder,
(g) said piston having a radial projection means intermediate its ends and disposed between the cylinder and sleeve,
(h) resilient means acting on said projection means to return said piston to its initial position, and
(i) means for adjusting the cylinder axially with respect to the sleeve to control the length of the stroke of the floating piston.

11. A meter pump adapted to be operated by a liquid pulsating pressure comprising, in combination:
(a) a housing having an inlet and an outlet,
(b) a cylindrical sleeve disposed within the housing,
(c) an adjustable cylinder mounted within the housing in axial alignment with the sleeve,
(d) said cylinder having a smaller inside diameter than the sleeve,
(e) said cylinder being spaced axially with respect to said sleeve,
(f) a floating piston disposed within the sleeve and cylinder,
(g) said piston having a radial projection disposed between the sleeve and cylinder,
(h) said cylinder being in communication with the inlet and outlet,
(i) a flexible cup member disposed on each end of the piston, and
(j) means for adjusting the cylinder axially with respect to the sleeve to obtain a predetermined displacement of the piston in the cylinder.

12. A meter pump adapted to be operated by a positive displacement pump comprising, in combination:
(a) a housing having an inlet and an outlet,
(b) means for supporting a floating piston within the housing,
(c) means for connecting the meter pump to the positive displacement pump so that the pulsating pressure of the positive displacement pump will actuate the floating piston to produce a pressure greater than the pressure created by the positive displacement pump, and
(d) said supporting means including adjustment means for controlling the displacement of the floating piston.

13. A meter pump adapted to be operated as a slave pump comprising, in combination:
(a) a housing having an inlet and an outlet, (b) cylinder means for supporting a floating piston within the housing,
(c) valve means for controlling the inlet and outlet,
(d) pulsating pressure means for actuating the floating piston to produce a pressure greater than the pressure created by the pulsating pressure means, and
(e) said cylinder including adjustment means for controlling the displacement of the floating piston.

References Cited by the Examiner
UNITED STATES PATENTS

| | | | |
|---|---|---|---|
| 1,571,845 | 2/1926 | Lefebve | 103—38 |
| 1,702,649 | 2/1929 | Gentzen | 103—9 |
| 1,858,600 | 5/1932 | Rosberg | 222—250 |
| 1,965,526 | 7/1934 | Willson | 222—318 |
| 2,295,228 | 9/1942 | Malsharry et al. | 299—87 |
| 2,427,818 | 9/1947 | Taylor | 103—9 |
| 2,434,771 | 1/1948 | Mueller | 222—318 |
| 2,566,436 | 9/1951 | Waite et al. | 222—129.2 X |
| 2,898,002 | 8/1959 | Blanchet | 222—318 |

LOUIS J. DEMBO, *Primary Examiner.*
LAURENCE V. EFNER, HADD S. LANE, *Examiners.*